(12) United States Patent
Fluman et al.

(10) Patent No.: US 9,459,676 B2
(45) Date of Patent: Oct. 4, 2016

(54) DATA STORAGE DEVICE CONTROL WITH POWER HAZARD MODE

(71) Applicant: International Business Machines Corporation, Armonk, NY (US)

(72) Inventors: Mudi M. Fluman, Haifa (IL); Yaacov Frank, Ramot Meir (IL); Janice M. Girouard, Austin, TX (US); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 14/064,847

(22) Filed: Oct. 28, 2013

(65) Prior Publication Data

US 2015/0121091 A1     Apr. 30, 2015

(51) Int. Cl.
*G06F 1/30* (2006.01)
*G06F 3/06* (2006.01)
*G06F 9/44* (2006.01)

(52) U.S. Cl.
CPC ............. *G06F 1/30* (2013.01); *G06F 3/0614* (2013.01); *G06F 3/0659* (2013.01); *G06F 3/0671* (2013.01); *G06F 9/442* (2013.01); *G06F 9/4418* (2013.01); *G06F 2003/0697* (2013.01)

(58) Field of Classification Search
CPC ...... G06F 1/30; G06F 3/0614; G06F 3/0659; G06F 3/0679; G06F 9/442; G06F 9/4418; G06F 2003/0697
See application file for complete search history.

(56) References Cited

U.S. PATENT DOCUMENTS

| | | | |
|---|---|---|---|
| 5,467,361 A | 11/1995 | Shipman, Jr. | |
| 5,511,204 A | 4/1996 | Crump et al. | |
| 7,085,886 B2 | 8/2006 | Hsu et al. | |
| 7,127,573 B1 * | 10/2006 | Strongin | G06F 1/3203 711/151 |
| 7,395,452 B2 | 7/2008 | Nicholson et al. | |
| 7,404,047 B2 * | 7/2008 | Dodd | G06F 13/1631 711/141 |
| 7,490,261 B2 | 2/2009 | Gaertner et al. | |
| 8,166,247 B2 | 4/2012 | Schwarz et al. | |
| 8,539,129 B2 * | 9/2013 | Wang | G06F 13/1663 710/110 |
| 8,694,719 B2 * | 4/2014 | Lassa | G06F 1/206 711/103 |
| 2006/0212644 A1 | 9/2006 | Acton et al. | |
| 2009/0228729 A1 * | 9/2009 | Lin | G06F 1/3203 713/322 |
| 2010/0180131 A1 * | 7/2010 | Liu | G06F 1/305 713/300 |
| 2010/0306446 A1 | 12/2010 | Villa et al. | |
| 2012/0054520 A1 | 3/2012 | Ben-Tsion | |
| 2012/0151241 A1 | 6/2012 | Kursula | |
| 2014/0164828 A1 * | 6/2014 | Banikazemi | G06F 11/1471 714/15 |

FOREIGN PATENT DOCUMENTS

CN          104571943 A     4/2015

* cited by examiner

*Primary Examiner* — M Elamin
(74) *Attorney, Agent, or Firm* — David B. Woycechowsky

(57) ABSTRACT

In response to a warning that power may be interrupted, a non-volatile data storage sub-system of a host computer system re-orders machine readable instructions that the non-volatile data storage sub-system is going to perform. This re-ordering of instructions decreases the probability that important data will be lost. The re-ordering of instructions is performed according to rules.

15 Claims, 2 Drawing Sheets

DATA STORAGE DEVICE CONTROL WITH POWER HAZARD MODE

BACKGROUND OF THE INVENTION

In currently conventional non-volatile data storage sub-systems, disks (or storage media having other geometries) are required to perform a significant number of tasks beyond the simple non-volatile storing and retrieving of data. For example, the health of the non-volatile storage medium should be frequently verified and recorded to insure the integrity of the data stored in a non-volatile manner on the medium. Tasks related to the health of the non-volatile storage medium are sometimes herein called "data integrity tasks" or "data integrity checks." These data integrity checks can require a significant proportion of the non-volatile storage medium's capacity and/or a significant proportion of the non-volatile storage sub-system's bandwidth.

When a computer system, including a non-volatile storage sub-system, detects a loss of external power supply, the computer system conventionally goes into an emergency shutdown procedure. During this shutdown period, the system is conventionally powered by an Uninterruptible Power Supply (UPS) which can prolong the operation of the computer system life by a short period (usually a few minutes). During this period, certain data called a "write cache," which is held in dynamic memory (that is, a form of volatile memory) on the host system, is "downloaded," in due course, to the non-volatile storage medium of the non-volatile storage sub-system. However, applications operate on the assumption that a write operation is successful when the application's data is merely written to the write cache in the volatile memory. For this reason, if a power failure (that is, running out of UPS power) occurs before the download of the application's data from volatile memory to the non-volatile storage medium of the non-volatile storage sub-system, then it is highly likely that at least some application data (for example, online data) will be lost, which is, of course, a generally bad outcome.

As a terminology note, "non-volatile" herein refers to data storage where the maintaining of the saved data requires no power, or very, very little power. As will be appreciated by those of skill in the art, non-volatile storage sub-systems usually do require power (usually electrical power) to write data (or to overwrite data in non-volatile data storage sub-systems that allow for overwrite of data).

SUMMARY

According to some aspects of the present invention, there is a method, system and/or computer program product for controlling a non-volatile data storage sub-system, including a non-volatile storage medium and a non-volatile sub-system controller, which is part of a host computer system. The method, system and/or computer program product perform the following steps (not necessarily in the following order): (i) entering, by the non-volatile data storage sub-system controller, power hazard mode in response to a power hazard signal; and (ii) during the power hazard mode, re-ordering, by the non-volatile data storage sub-system controller and on an ongoing basis, a list of instructions to be performed by the non-volatile data storage sub-system controller. At least the re-ordering of the list of instructions is performed by computer software running on computer hardware.

DETAILED DESCRIPTION

Figure 1:
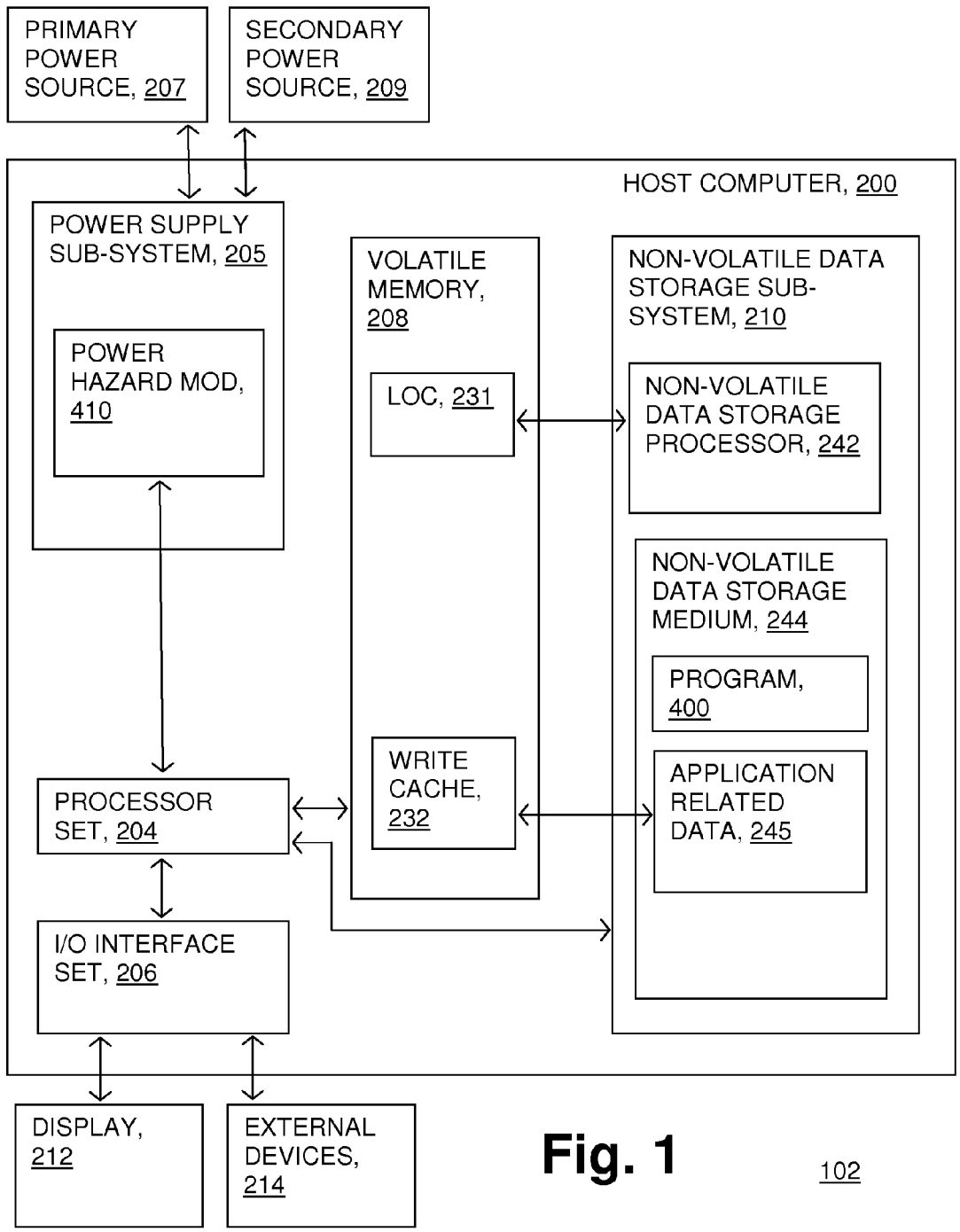
FIG. 1 is a schematic view of a first embodiment of a host computer system according to the present invention.

In some embodiments of the present invention, a power hazard condition (that is, a condition indicating that power is likely to be lost) causes the non-volatile storage media controller (for example, disk drive controller) to operate in a different mode during the duration of the power hazard condition. More specifically, a set of rules controls the re-ordering of non-volatile storage commands to optimize the kinds of data that will be stored if the power is indeed lost. This Detailed Description section is divided into the following sub-sections: (i) The Hardware and Software Environment; (ii) First Embodiment; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
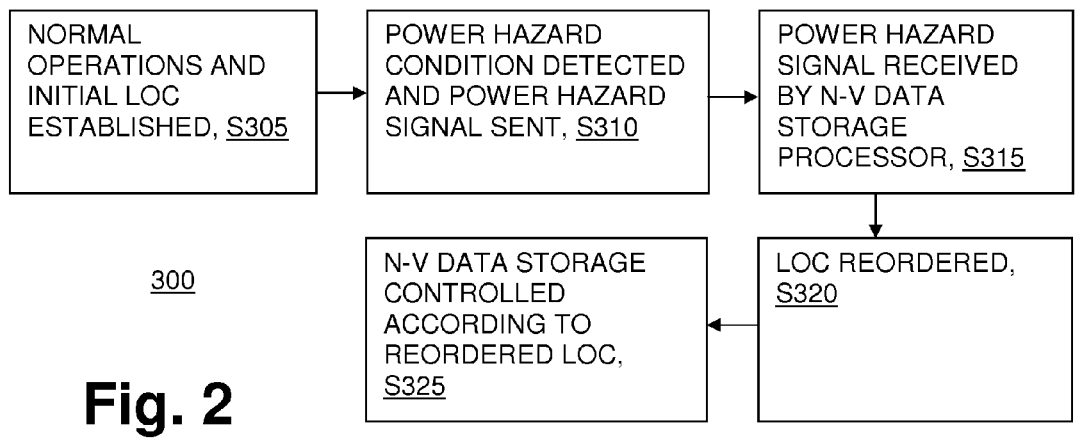
FIG. 2 is a flowchart showing a process performed, at least in part, by the first embodiment host computer system.

An embodiment of a possible hardware and software environment for software and/or methods according to the present invention will now be described in detail with reference to the Figures. FIGS. 1 and 2 collectively make up a functional block diagram illustrating various portions of host computer system 102, including: host computer 200; processor set 204; power supply sub-system 205; input/output (i/o) interface set 206; volatile memory set 208; non-volatile data storage sub-system 210; display device 212; external device set 214; list of commands (LOC) 231; write cache 232; non-volatile data storage processor 242; non-volatile data storage medium 244; application related data portion 245; program 400 and power hazard module ("mod") 410. Several portions of host computer sub-system 102 will now be discussed in the following paragraphs.

Host computer sub-system 102 may be a server, mainframe, laptop computer, tablet computer, netbook computer, personal computer (PC), a desktop computer, a personal digital assistant (PDA), a smart phone, or any programmable electronic device. Program 400 is a collection of machine readable instructions and/or data that is used to create, manage and control certain software functions that will be discussed in detail, below, in the First Embodiment sub-section of this Detailed Description section.

As shown in FIG. 1, host computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Volatile memory 208 (which is shown separately from processors 204 and 242 in this example, but may be located, in whole or in part, on these processors) and non-volatile data storage media 244 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 400 is stored in persistent storage 210 for access and/or execution by one or more of the respective computer processors 204, 242, usually through one or more memories of memory 208. In this embodiment memory 208 is both a: (i) tangible medium software storage device; and (ii) a non-transitory software storage device (see, Definitions sub-section of this detailed description section, below).

Program 400 may include both machine readable and performable instructions and/or substantive data (that is, the type of data stored in a database). In this particular embodiment, non-volatile data storage medium 244 a magnetic hard disk drive. Non-volatile data storage medium 244 may be removable. Other examples include optical and magnetic disks, thumb drives, flash drives and smart cards.

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, flash drives, smart cards, portable optical or magnetic disks, and memory cards. Software and data used to practice embodiments of the present invention, for example, program 400, can be stored on such portable computer-readable storage media. In these embodiments the relevant software may (or may not) be loaded, in whole or in part, onto non-volatile data storage medium 244 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. FIRST EMBODIMENT

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
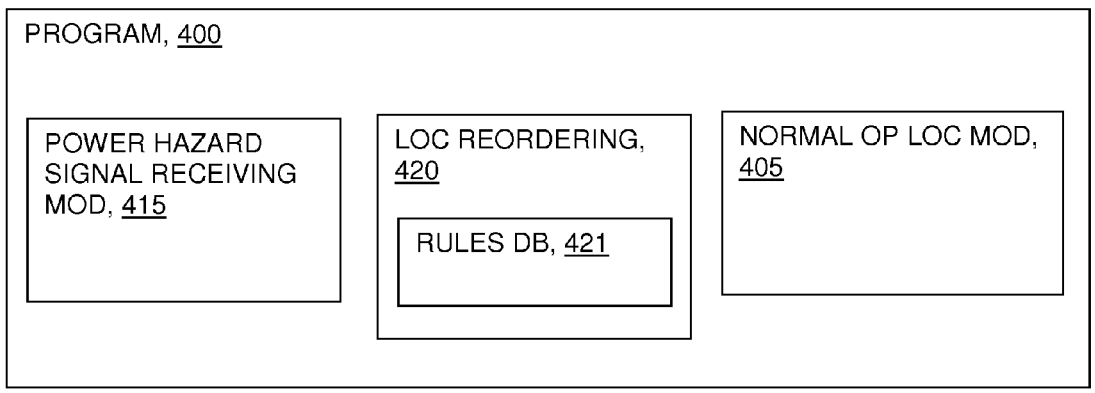
FIG. 3 is a schematic view of a portion of the first embodiment host computer system.

FIG. 2 shows a flow chart 300 depicting a method according to the present invention. FIG. 3 shows program 400 for performing at least some of the method steps of flow chart 300. This method and associated software will now be discussed, over the course of the following paragraphs, with extensive reference to FIG. 2 (for the method step blocks) and FIG. 3 (for the software blocks).

Referring now to FIGS. 1, 2 and 3, processing begins at step S305, where: (i) normal operations of host computer sub-system 102 take place; and (ii) normal operations list of commands (LOC) mod 405 causes LOC 231 to control non-volatile data store processor 242 to write data from write cache 232 of volatile memory 208 to application related data mod 245 of non-volatile storage medium 244 of non-volatile data storage sub-system 210 in the conventional manner. In other words, various applications are running on the host computer system, and these generate data to be saved, which is first written to the write cache of the volatile memory before being stored in the non-volatile storage device.

By controlling non-volatile data storage processor 242, the LOC controls the order in which this data is written, as well as controlling ancillary data storage operations, such as the data integrity tasks mentioned above. At step S305, the host computer system is running on electrical power from primary power source 207. The LOC is sometimes referred to as an "initial LOC" because it is the LOC having the form, content and order (see definition of "LOC order/re-ordering" below in the Definitions sub-section of this Detailed Description section) as it exists during normal operations and before there is any re-ordering pursuant to a power hazard mode. To explain more specifically the roles of the two separate processor sets 204 and 242 in this embodiment: (i) processor (or processor set) 242 re-orders the commands that directly control storage on the non-volatile medium; (ii) main processor set 204 runs the computer generally and the user interface; (iii) main processor set 204 will assign correct priorities on the commands going to the non-volatile storage sub-system; and (iv) main processor set 204 does not re-order the storage commands in power hazard mode as this is an exclusive function of the non-volatile sub-system's dedicated processor (set) 242.

Processing proceeds to step S310 where power hazard mod 410 of power supply system 205: (i) detects a power hazard condition (in this example, a switch from primary power source 207 to secondary power source 209); and (ii) sends out a power hazard signal to non-volatile data storage processor 242 (via processor set 204).

Processing proceeds to step S315 where power hazard receiving mod 415 (as being executed on non-volatile data storage processor 242) receives the power hazard signal sent out at step S310. In response to the signal, non-volatile data storage sub-system enters into a "power hazard mode," with consequences that will be explained in connections with step S320 below.

Processing proceeds to step S320 where LOC non-volatile data storage processor 242 (according to code stored as re-ordering mod 420) re-orders LOC 231 using rules from rules database 421. In this simple example, there is only a single rule, which is that all data integrity related tasks are cancelled and removed from LOC 231. Alternatively, there may be more rules, and more complex rules, for re-ordering the LOC. An example of a system with more, and more complicated, rules will be presented in the Further Comments And/Or Embodiments sub-section of this Detailed Description section. In this example, because data integrity related tasks are removed from LOC 231, this means that data will generally be more quickly written from write cache 232 to application related data portion 245 of non-volatile data storage medium 244. The LOC, after it has been re-ordered in response to power hazard mode, is herein referred to as a "re-ordered LOC." As shown in step S325, operation under the re-ordered LOC continues until either: (i) secondary power source 209 is exhausted and there is no more power; or (ii) primary power source returns and normal operations resume (as described, above, in connection with step S305).

III. FURTHER COMMENTS AND/OR EMBODIMENTS

The present disclosure recognizes that increased cooperation between the non-volatile storage sub-system and the data storage application layer exists today. The present disclosure recognizes a potential problem due to the fact that co-operation between the non-volatile storage sub-system and the data storage application layer is often limited to: (i) a limit on the total time between data integrity checks; and (ii) enabling or disabling the data integrity check function. The present disclosure further recognizes that this can be problematic because the non-volatile storage sub-system may be programmed to execute these background tasks at a time that turns out to be an inopportune time, such as during an emergency shutdown operation caused by a power loss.

Some embodiments of the present disclosure may have one, or more, of the following features, characteristics and/or advantages: (i) a handshake (note: the terms handshake and command are used interchangeably in this document) between a host application and its associated non-volatile data storage sub-system informs the non-volatile data storage sub-system that an emergency shutdown may be imminent; (ii) in response to being informed that a shutdown may be imminent, a non-volatile data storage sub-system re-prioritizes its work (that is, re-orders machine readable instructions that it is going to follow).

With respect to item (ii) in the list of the preceding paragraph, the re-ordering of instructions may be performed according to one, or more, of the following rules: (a) all background tasks (such as the background media scan) are suspended; (b) all commands are executed in order (absent power hazard mode re-ordering); (c) any internal write caching housed on the external disk is disabled (meaning that any returned status, for writes, etc., represent the status of the command to non-volatile memory; (d) all writes are given priority above all other commands (sometimes herein referred to as "cmds"); (e) all reads are prioritized behind any pending write requests; (f) error recovery is prioritized behind the initial read or write requests for existing queued commands; and (g) the disk will log key data for each cmd executed during this potential error recovery period. With respect to rule (e), this rule can be helpful because it is not uncommon for 95% (and above) of the successful error recovery to be made within 0.5 seconds. Yet it can take up to 20 seconds of wall clock time for full error recovery if all available recovery steps are performed. During this error recovery time all commands to the disks (other than error recovery) are suspended, creating an effective blackout period that can take up a high percentage of your available UPS (Uninterruptible Power Supply) recovery time (especially if more than one disk block needs to be recovered). With respect to rule (g), as an illustrative example, the request type, block address affected, completion status, etc could be logged while in this mode. Often 2 or more separate copies of data are kept in a storage system. This data can later be used to resolve discrepancies in the data.

In at least some, if not all, embodiments, after the computer host has informed the non-volatile data storage sub-system that a power loss may be coming soon, the non-volatile data storage sub-system is expected to remain powered up, and does not power itself down (or at least does not immediately power itself down). For example, the warning of a coming power loss may proceed the actual loss of power for at least one of the following reasons: (i) there is a secondary power source (for example, a UPS) that has taken over on a temporary basis; and/or (ii) conditions signaling a possible power loss (for example, electrical storms in the area) are detected. The purpose of the "handshake" communication, from the host system to the non-volatile storage sub-system, is to ready the non-volatile data storage sub-system for shutdown and to minimize the probability of data loss (or at least loss of relatively important data) should there fail to be power-up operating time to allow the host to write all of its data to disk.

If the power is restored while a secondary power source (for example, the UPS) is able to support the disk power requirements, the host makes a new "handshake" communication cancelling this special "power hazard mode" and the non-volatile storage-subsystem priorities will return to normal (either before or after any remaining re-ordered instructions are performed by the non-volatile storage sub-system).

Some conventional devices may have the feature of the CPU triggering a flush of the cache to disk based on the processor going from a first to a second power supply state. However, this does not address the processing order of commands executed on the disk itself.

Some conventional devices may include the feature of, upon the notification of an impending power loss, each host backs up their local cache memory to both disks, thus upon resumption of normal operation, if one of the clusters subsequently fails to resume normal operations, data from the failed cluster is available through the operating device. However, this does not address the ordering of commands on the disk (or storage device).

Some conventional devices may include an algorithm wherein data flowing from the volatile write buffer directly into the disk drive bypasses the non-volatile cache while disk drive power is present. However, this does not address ordering of commands on the disk.

Some conventional devices may have the feature of giving priority to disk I/O operations on the host side that are flushing the cache, versus new I/O requests from an application. All of these priority changes are on the host processor side, and not the disk side.

Some conventional devices may have the feature of monitoring whether an NVRAM (non-volatile random-access memory) device has a background task pending, and scheduling it if a power loss is imminent. The NVRAM device suspends the background operation or completes the background operation prior to loss of supply power if the NVRAM device implements the background operation. However, this does not address the ordering of commands on the disk.

Some embodiments of the present disclosure: (i) are implemented by novel disk processor logic (as contrasted with power hazard response systems that are implemented in the host logic); and (ii) affirmatively command (rather than merely allow) suspension of background tasks (under a rule in a set of rules).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit, regardless of whether the device is volatile or non-volatile.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, servers, laptop computers, field-programmable gate array (fpga) based devices, smart phones, personal digital assistants (PDAs), body-mounted or inserted computers, embedded device style computers, and application-specific integrated circuit (ASIC) based devices.

LOC order/re-ordering: any change to the form, order and/or content either as it exists, or as it is updated; LOC re-ordering may include (without limitation): removing commands, rewriting commands, adding commands, suspending commands and/or changing the order of commands.

What is claimed is:

1. A method of controlling a non-volatile data storage sub-system, including a non-volatile storage medium and a non-volatile sub-system controller, which is part of a host computer system, the method comprising:
    entering, by the non-volatile data storage sub-system controller, power hazard mode in response to a power hazard signal; and
    during the power hazard mode, re-ordering, by the non-volatile data storage sub-system controller and on an ongoing basis, a list of instructions to be performed by the non-volatile data storage sub-system controller; and
    during the power hazard mode, performing, by the non-volatile data storage sub-system, at least a portion of the list of instructions in the re-ordered order to write data to the non-volatile storage medium in a different order than the data would have been written if the re-ordering of the list of instructions had not been performed
    wherein:
    at least the re-ordering of the list of instructions is performed by computer software running on computer hardware; and
    the re-ordering by the non-volatile data storage sub-system controller is done according to a set of rules; and
    the set of rules includes at least one of the following rules:
        (i) all background task related commands are suspended,
        (ii) all commands are executed in order received absent re-ordering,
        (iii) any internal write caching commands, which involve writing data to an external storage medium, are suspended,
        (iv) all write commands are given priority above all other commands,
        (v) all read commands are prioritized behind any write commands,
        (vi) all error-recovery-related read commands are prioritized behind any non-error-recovery-related read commands, and
        (vii) all error-recovery-related write commands are prioritized behind any non-error-recovery-related write commands.

2. The method of claim 1 wherein:
the set of rules includes all of the following rules:
(i) all background task related commands are suspended,
(ii) all commands are executed in order received absent re-ordering,
(iii) any internal write caching commands, which involve writing data to an external storage medium, are suspended,
(iv) all write commands are given priority above all other commands,
(v) all read commands are prioritized behind any write commands,
(vi) all error-recovery-related read commands are prioritized behind any non-error-recovery-related read commands, and
(vii) all error-recovery-related write commands are prioritized behind any non-error-recovery-related write commands.

3. The method of claim 1 further comprising:
during power hazard mode, logging, by the non-volatile data storage sub-system controller, key data to the non-volatile data storage medium for each command executed.

4. The method of claim 1 further comprising:
detecting, by the host computer system, that a primary power source has been lost; and
in response to detecting that the primary power source has been lost, sending, by the host computer system to the non-volatile data storage sub-system, the power hazard signal.

5. The method of claim 4 further comprising:
detecting, by the host computer system, that a primary power source has been regained;
in response to detecting that the primary power source has been regained, sending, by the host computer system to the non-volatile data storage sub-system, a power regained signal; and
exiting, by the non-volatile data storage sub-system controller, power hazard mode in response to the power regained signal.

6. A computer program product for controlling a non-volatile data storage sub-system, including a non-volatile storage medium and a non-volatile sub-system controller, which is part of a host computer system, the computer program product comprising software stored on a software storage device, the software comprising:
    first program instructions programmed to enter, by the non-volatile data storage sub-system controller, power hazard mode in response to a power hazard signal; and
    second program instructions programmed to, during the power hazard mode, re-order, by the non-volatile data storage sub-system controller and on an ongoing basis, a list of instructions to be performed by the non-volatile data storage sub-system controller; and
    third program instructions programmed to, during the power hazard mode, perform, by the non-volatile data storage sub-system, at least a portion of the list of instructions in the re-ordered order to write data to the non-volatile storage medium in a different order than the data would have been written if the re-ordering of the list of instructions had not been performed;
    wherein:
    the software is stored on a software storage device in a manner less transitory than a signal in transit; and
    the re-ordering by the non-volatile data storage sub-system controller is done according to a set of rules; and
    the set of rules includes at least one of the following rules:
        (i) all background task related commands are suspended,
        (ii) all commands are executed in order received absent re-ordering, (iii) any internal write caching commands, which involve writing data to an external storage medium, are suspended,
(iv) all write commands are given priority above all other commands,
(v) all read commands are prioritized behind any write commands,
(vi) all error-recovery-related read commands are prioritized behind any non-error-recovery-related read commands, and
(vii) all error-recovery-related write commands are prioritized behind any non-error-recovery-related write commands.

7. The product of claim 6 wherein:
the set of rules includes all of the following rules:
(i) all background task related commands are suspended,
(ii) all commands are executed in order received absent re-ordering,
(iii) any internal write caching commands, which involve writing data to an external storage medium, are suspended,
(iv) all write commands are given priority above all other commands,
(v) all read commands are prioritized behind any write commands,
(vi) all error-recovery-related read commands are prioritized behind any non-error-recovery-related read commands, and
(vii) all error-recovery-related write commands are prioritized behind any non-error-recovery-related write commands.

8. The product of claim 6 further comprising:
third program instructions programmed to, during power hazard mode, log, by the non-volatile data storage sub-system controller, key data to the non-volatile data storage medium for each command executed.

9. The product of claim 6 further comprising:
third program instructions programmed to detect, by the host computer system, that a primary power source has been lost; and
fourth program instructions programmed to, in response to detecting that the primary power source has been lost, send, by the host computer system to the non-volatile data storage sub-system, the power hazard signal.

10. The product of claim 9 further comprising:
fifth program instructions programmed to detect, by the host computer system, that a primary power source has been regained;
sixth program instructions programmed to, in response to detecting that the primary power source has been regained, send, by the host computer system to the non-volatile data storage sub-system, a power regained signal; and
seventh program instructions programmed to exit, by the non-volatile data storage sub-system controller, power hazard mode in response to the power regained signal.

11. A computer system for controlling a non-volatile data storage sub-system, including a non-volatile storage medium and a non-volatile sub-system controller, which is part of a host computer system, the computer system comprising:
a first processor(s) set which controls the host system;
a second processor(s) set which implements the non-volatile sub-system controller; and
a software storage device;
wherein:
the processor set is structured, located, connected and/or programmed to run software stored on the software storage device; and
the software comprises:
first program instructions programmed to enter, by the non-volatile data storage sub-system controller, power hazard mode in response to a power hazard signal,
second program instructions programmed to, during the power hazard mode, re-order, by the non-volatile data storage sub-system controller and on an ongoing basis, a list of instructions to be performed by the non-volatile data storage sub-system controller, and
third program instructions programmed to, during the power hazard mode, perform, by the non-volatile data storage sub-system, at least a portion of the list of instructions in the re-ordered order to write data to the non-volatile storage medium in a different order than the data would have been written if the re-ordering of the list of instructions had not been performed;
wherein:
the re-ordering by the non-volatile data storage sub-system controller is done according to a set of rules; and
the set of rules includes at least one of the following rules:
(i) all background task related commands are suspended,
(ii) all commands are executed in order received absent re-ordering,
(iii) any internal write caching commands, which involve writing data to an external storage medium, are suspended,
(iv) all write commands are given priority above all other commands,
(v) all read commands are prioritized behind any write commands,
(vi) all error-recovery-related read commands are prioritized behind any non-error-recovery-related read commands, and
(vii) all error-recovery-related write commands are prioritized behind any non-error-recovery-related write commands.

12. The system of claim 11 wherein:
the set of rules includes all of the following rules:
(i) all background task related commands are suspended,
(ii) all commands are executed in order received absent re-ordering,
(iii) any internal write caching commands, which involve writing data to an external storage medium, are suspended,
(iv) all write commands are given priority above all other commands,
(v) all read commands are prioritized behind any write commands,
(vi) all error-recovery-related read commands are prioritized behind any non-error-recovery-related read commands, and
(vii) all error-recovery-related write commands are prioritized behind any non-error-recovery-related write commands.

13. The system of claim 11 further comprising:
third program instructions programmed to, during power hazard mode, log, by the non-volatile data storage sub-system controller, key data to the non-volatile data storage medium for each command executed.

14. The system of claim 11 further comprising:
third program instructions programmed to detect, by the host computer system, that a primary power source has been lost; and
fourth program instructions programmed to, in response to detecting that the primary power source has been lost, send, by the host computer system to the non-volatile data storage sub-system, the power hazard signal.

15. The system of claim 14 further comprising:
fifth program instructions programmed to detect, by the host computer system, that a primary power source has been regained;
sixth program instructions programmed to, in response to detecting that the primary power source has been regained, send, by the host computer system to the non-volatile data storage sub-system, a power regained signal; and
seventh program instructions programmed to exit, by the non-volatile data storage sub-system controller, power hazard mode in response to the power regained signal.

\* \* \* \* \*